Patented Apr. 7, 1942

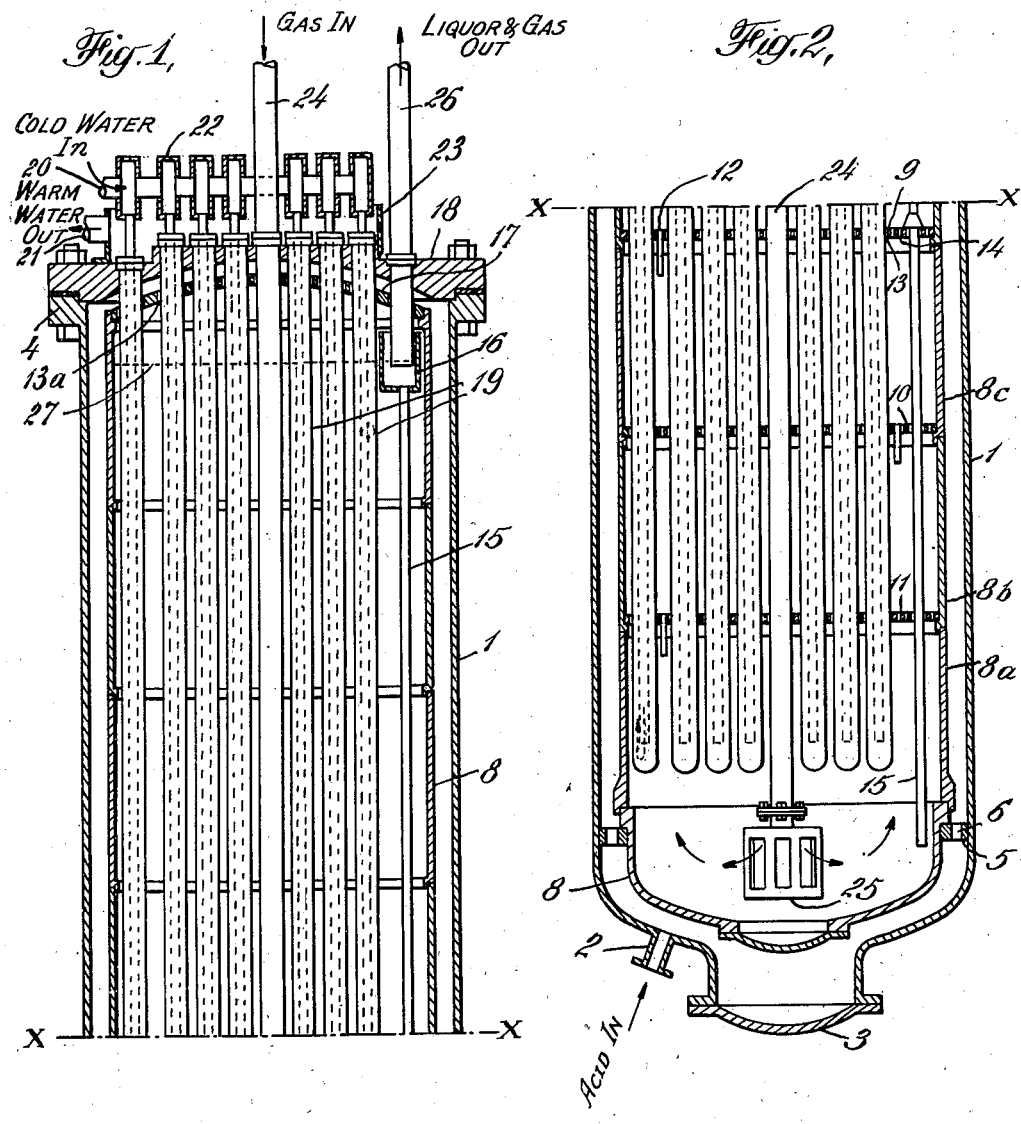

2,278,778

UNITED STATES PATENT OFFICE 2,278,778

APPARATUS FOR TREATMENT OF GASES WITH SULPHURIC ACID

Samuel W. Grossmann and Donald A. Rogers, Petersburg, Va., assignors to The Solvay Process Company, New York, N. Y., a corporation of New York Application August 23, 1939, Serial No. 291,510

14 Claims. (Cl. 261—112)

This invention is concerned with the absorption of gases in concentrated sulphuric acid and more particularly the absorption of olefines in concentrated sulphuric acid.

The following description of the absorption of ethylene in sulphuric acid will serve to typify the problems involved and their solution by means of our invention.

In the manufacture of ethyl alcohol by absorbing ethylene in concentrated sulphuric acid and subsequently hydrolyzing the absorption product, considerable difficulty is encountered in the absorption step. For example, ethylene is slow to dissolve in sulphuric acid and even after dissolving it is slow to react with the acid. High pressures must be employed to attain a satisfactory rate of reaction. High temperatures are not permissible as they result in the formation of polymers and free carbon. Such side reactions not only result in lower conversion efficiency but may cause clogging and fouling of the apparatus. Moreover, high temperatures result in an increased rate of corrosion of equipment. Nevertheless, to maintain a satisfactory rate of reaction a moderately elevated temperature, such as 80° C., must be maintained.

Because of the corrosive nature of the absorption liquor (which is generally prepared from about 95% sulphuric acid), the high pressure involved, and the somewhat elevated temperature necessary for rapid reaction, difficulties are encountered in construction. Thus, it is necessary to construct the absorption vessel from an acid-resistant material, such as ceramic ware. Absorption apparatus of industrial size cannot be prepared conveniently from a single piece and is most suitably constructed of sections cemented or otherwise joined together. Such a structure is not adapted to withstand the high pressures necessary for absorption; for example, about 200 pounds per square inch above atmospheric. If ceramic-lined metal is employed, cracks or crevices in the lining may develop and permit the hot acid to attack the metal. One method of avoiding excessive leakage and corrosion while supplying the required strength is to fit the absorption vessel with an outer concentric vessel constructed of steel and fill the annular space thus formed between the inner and outer vessels with a protective fluid under pressure. However, such an apparatus presents its own peculiar problems. There is almost inevitably leakage into the absorption vessel from the annular space or leakage in the opposite direction and the effect of this must be taken into account. If water is used as the protective fluid and there is an inward leakage, there results an undesirable dilution of the reaction liquor, which must be maintained at a high concentration, and, furthermore, heat is evolved, thereby increasing the supply of cooling medium required and making temperature control more difficult. On the other hand, if the leakage is outward into the annular space there results a loss of reactant materials and the formation in the annular space of dilute aqueous sulphuric acid which will attack the outer vessel. The dilute aqueous acid may even attack the outer wall of the inner vessel since dilute sulphuric acid is much more corrosive to some materials than the very concentrated acid.

A further problem in the design and operation of suitable absorbers for ethylene in sulphuric acid is to insure intimate contact between gas and liquid. If this is accomplished by bubbling air through a body of concentrated sulphuric acid, the turbulence caused thereby will result in homogeneity of the reaction liquor. Homogeneity is undesirable because it is not as favorable to the production of a highly concentrated product as a gradient of ethylene concentrations from acid inlet to acid outlet.

It is an object of this invention to devise a relatively inexpensive apparatus and a mode of operation which will permit rapid, continuous absorption of ethylene and other gases in concentrated sulphuric acid, especially at elevated pressures and moderately elevated temperatures while avoiding the disadvantages attending the use of former types of absorption apparatus.

The apparatus of our invention comprises an inner vessel constructed of a material resistant to hot concentrated sulphuric acid, which need not be fluid tight nor adapted to resist high pressures, an outer vessel of pressure-resistant and leak-proof construction sufficiently large to form a space for liquid flow between the inner and outer vessels, means for introducing cold concentrated sulphuric acid into the space between the inner and outer vessels, and means for passing the acid in sequence through said space and through the inner vessel. The inner vessel may be constructed of Duriron, Hastelloy A or C, acid-proof cement or ceramic material of sufficient thickness to offer substantial resistance to flow of heat therethrough.

A type of apparatus adapted to the above requirements and having still other advantages enumerated below is illustrated by the figures of the accompanying drawing, wherein Figs. 1 and 2 depict a vertical medial section of my preferred olefine absorber above and below line x—x, respectively.

With reference to Figs. 1 and 2 of the drawing, numeral 1 designates a vertically elongated cylindrical vessel constructed of steel or other material capable of withstanding high pressures and resistant to the action of cold or moderately warm concentrated sulphuric acid. Vessel 1 has an acid inlet 2 and a clean-out door 3 at the bottom and is open at its upper end and provided with a heavy flange 4. Disposed within vessel 1 and supported therein on annulus 5, which may be welded into the wall of vessel 1 and is provided with perforations 6 to permit ready flow of liquid therethrough, is a vertically elongated cylindrical vessel 8 composed of sections 8a, 8b, 8c, etc. spaced from vessel 1.

In the lower half of vessel 8 are arranged three horizontal baffles 9, 10, and 11, each provided with a short conduit section 12 extending a substantial distance below the bottom of the baffle. The baffles also are provided with apertures 13 and 14. Apertures 14 preferably have a diameter only a fraction of the inside diameter of conduits 12. These apertures along with apertures 13 permit passage of gas vertically up through the baffles. Since the gas passing up through these apertures resists flow of liquid in an opposite direction, flow of liquid will be for the most part through the conduits 12.

Within and at one side of vessel 8, preferably the side opposite the conduit sections 12 in baffles 9 and 11, is disposed a vertical conduit 15 open at the bottom near the bottom of vessel 1 and having its upper end enlarged to form a cup 16 which is disposed at about the desired level of liquid in the vessel 1 providing a few inches of gas space between the liquid level and the top of the absorption vessel. The absorption vessel 8 has a top 17 with apertures 13a therein similar to apertures 13 in baffles 9, 10, and 11. Vessel 1 is provided with a cover unit 18 which coacts with flange 4 to provide a gas-tight lid for the apparatus and may be secured by means of bolts or other clamping means to provide a strong, tight joint. Passing through unit 18 are a plurality of bayonet type cooling tubes 19 connected with an inlet 20 and outlet 21 for cooling fluid by manifold 22, which distributes cooling fluid among the cooling tubes, and manifold 23, which collects it therefrom. Cooling tubes 19 extend down through the apertures 13a in top 17 and the corresponding apertures 13 in baffles 9, 10, and 11 to a point near the bottom of vessel 8. However, as the heat developed in the lower compartments of the absorber is generally less than in the upper compartments, it may be preferable to proportion the tubes differently, terminating some in the upper compartments. Apertures 13 are sufficiently large to permit ready passage of bayonet tubes therethrough and provide a small amount of clearance around the tubes.

Passing through unit 18 is also a gas inlet tube 24 which extends to a point below the bottom of cooling tubes 19 and has a distributor 25 affixed to its open lower end. An outlet conduit 26 also is mounted in unit 18 in such a manner that when unit 18 is in position atop vessel 1, conduit 26 is disposed within cup 16 with its open lower end disposed at approximately the desired liquid level.

Instead of providing conduit 15 within vessel 8 an outlet through the bottoms of vessels 8 and 1 may be provided and the outlet conduit may be brought up alongside and outside the absorber and connected with a cup like cup 16 but closed and connected at the top by a conduit to the gas space in the top of vessel 8. Or the conduit 15 may lead through the top of the absorber and the cup 16 thus placed outside. In this case too the cup should be closed and should have a gas connection with the absorber. In either case wherein the cup 16 is disposed outside, it is connected with an outlet conduit at the desired liquid level.

In operation the above apparatus functions as follows: Cold 95-96% sulphuric acid is introduced at acid inlet 2 and proceeds up through the annular space between vessels 1 and 8 and through apertures 13a into vessel 8. Acid is charged until vessel 8 is filled with acid about to the lower end of outlet pipe 26. Ethylene-containing gas, for instance a mixture containing 35-40% by volume of ethylene and the balance primarily methane, ethane, and hydrogen is introduced through inlet 24 to build up and maintain the internal pressure at about 200 pounds per square inch, gauge. Sulphuric acid is introduced gradually and preferably continuously at inlet 2. Reaction products are exhausted through outlet 26 more or less continuously. Sulphuric acid mixed with ethyl sulphuric acid reaction product passes downward in vessel 8 to baffle 9. At this point all or the greater part of the acid is forced to pursue a tortuous path via conduits 12, the liquid stream flowing approximately at right angles to the flow of cooling liquid in tubes 19. When it reaches the bottom of vessel 1 it passes up through conduit 15 and finally out through pipe 26. The ethylene-containing gas introduced through pipe 24 enters the liquid through distributor 25 and bubbles upwardly through apertures 14 and the clearances between tubes 19 and the walls of apertures 13 to the gas space above the liquid level 27.

The reaction space is cooled by means of water flowing in at 20, down through the central tubes of the bayonet tubes 19 and upwardly through the annular space and out at 21. In this way a suitable reaction temperature, e. g. about 80° C. may be easily maintained.

The spent gas at the top of vessel 8 and the enriched liquor at the bottom thereof, consisting, for instance, of 90% to 97% ethyl sulphuric acid and the remainder unreacted sulphuric acid and water introduced therewith, are withdrawn through the conduit 26. The latter withdraws both gas and liquid at such relative rates that the liquid level is maintained approximately constant at 27.

The apparatus and mode of operation just described have, among others, the following notable advantages:

The provision of a jacket of reagent sulphuric acid for the absorption vessel 8 solves the problem of leakage above referred to. An ordinary steel vessel resists the action of cold concentrated sulphuric acid, e. g. 95% sulphuric acid, sufficiently to permit its use as an exterior vessel forming a jacketing space about an inner vessel built in sections of a highly acid-resistant material such as ceramic ware, which has, however, a low pressure-resistant capacity. By properly selecting the temperature of the entering sulphuric acid, its rate of flow, and the thickness of the wall of the inner vessel, this jacket of acid can be kept from heating up to a point where it attacks the outer steel vessel at an appreciable rate. Cold concentrated sulphuric acid has the advantage over water as a jacketing fluid in that in the event of leakage from the jacketing space into the absorption vessel or vice versa there are no ill effects. If leakage occurs into the absorption vessel there is no dilution of the acid therein (which must be maintained at a high concentration for rapid absorption) and no heating effect (which would be undesirable due to its tendency to promote side reactions and corrosion. Likewise, in the event of outward leakage into the jacketing space there is no heating effect (which would promote corrosion). Furthermore, there is no formation of highly corrosive dilute sulphuric acid and there is no loss of materials as the jacketing fluid is subsequently passed into the absorption vessel.

The advantages of the interior arrangement of baffles and cooling pipes as described above are as follows: The baffles preserve a gradient of concentrations in the acid liquor, thus preventing the turbulence produced by the ascending gas from causing the liquor to become homogeneous in composition. Thus a liquor highly concentrated in ethylene or other soluble gaseous component can more readily be produced. At the same time highly efficient contact between the gas and liquor is maintained due both to the fine dispersion of the ascending gas and to the cross-currents of liquor and gas resulting from the alternate arrangement of ports. Furthermore, due to the fact that the liquor is caused to flow across the cooling pipes, more efficient heat transfer is obtained.

In the case of ethylene absorption the object of baffling only the lower part of the absorption vessel as shown in Figs. 1 and 2 is as follows: In the absorption of ethylene in concentrated sulphuric acid, the rate of absorption increases with the concentration of dissolved ethylene up to about 0.7 mol of ethylene per mol of sulphuric acid. Thereafter it decreases with increasing ethylene concentrations. Consequently, it is desirable to obtain as much absorption as possible at the concentration where the rate is highest. However, it is also desirable to obtain a final product containing more than 0.7 mol of ethylene per mol of sulphuric acid, e. g. about 0.95 mol. The two ends are conveniently accomplished in the above-described apparatus. In the large, unbaffled space above the line $x$—$x$ in Fig. 1, the turbulence of the ascending gas maintains the absorption liquor in a substantially homogeneous condition, which can be maintained at the desired concentration (about 0.7 mol of ethylene per mol of sulphuric acid) by suitably regulating the input of ethylene and sulphuric acid and the rate of withdrawal of product. In the baffled space below the line $x$—$x$ in Fig. 2, due to the counter-current nature of the process, the concentration of ethylene is built up to a point considerably beyond that attained in the upper space, e. g. to around 0.95 mol per mol of sulphuric acid. Thereby, advantage is taken of the maximum in the absorption rate of ethylene and a more concentrated product is finally obtained than corresponds to this maximum.

However, in absorption processes of the normal type where the rate of absorption always decreases with increase of concentration of absorbed material, it may be desirable to extend the baffling to the top part of the absorption vessel.

It is preferred to employ concentric cooling pipes and to pass the cooling fluid into the inner pipe and out through the annular space between the inner and outer pipes, because this type of construction reduces the number of joints exposed to the corrosive acid liquor as compared with other types; for example, single pipes in the form of coils.

The means indicated for withdrawing acid liquor and gas provide a simple arrangement whereby acid can be withdrawn from the bottom where it is most concentrated in ethylene or other soluble component, and gas can be withdrawn from the top where it is poorest in the soluble component, and a nearly constant liquid level can be maintained. Alternative means of carrying out the removal of the products of reaction generally involve difficulty in maintaining the liquid level.

As above indicated, the outer vessel 1 may be constructed of steel. The inner vessel 8 may be constructed of Duriron, Hastelloy A or C, acid-proof cement, or ceramic ware. The tubes and baffles may be constructed of materials such as Hastelloy A or C or Duriron.

Although the apparatus and method constituting my invention have been discussed with particular reference to the absorption of ethylene by hot concentrated sulphuric acid, they possess advantages in the case of other processes involving absorption of gases in concentrated sulphuric acid.

We claim:

1. Apparatus for reacting a gas with hot concentrated sulphuric acid at high pressure comprising an inner vessel resistant to hot concentrated sulphuric acid, an outer vessel of fluid-tight, pressure-resistant construction which is less resistant to hot concentrated sulphuric acid than said inner vessel and sufficiently larger than the inner vessel to provide a space between adequate for maintaining liquid flow therethrough, means for introducing cold concentrated sulphuric acid into said space, means for causing cold concentrated sulphuric acid to flow in sequence through said space and into the inner vessel, and means for introducing a gas into the inner vessel.

2. Apparatus for absorption of olefine from an olefine-containing gas by hot concentrated sulphuric acid at high pressure, which comprises a reaction vessel composed of material resistant to hot concentrated sulphuric acid but not adapted for high pressure differentials between the outside and inside thereof, an outer vessel surrounding said reaction vessel and spaced therefrom, said outer vessel being composed of material less resistant to hot concentrated sulphuric acid than said inner vessel and capable of withstanding a high pressure therein, an inlet for cold sulphuric acid at one end of said outer vessel and a passage for liquid from said outer vessel to said reaction vessel at the other end, an inlet for passing gas into said reaction vessel at the end thereof opposite said liquid passage, and an outlet conduit for withdrawing reaction product from the reaction vessel.

3. Apparatus for absorption of olefine from an olefine-containing gas by hot concentrated sulphuric acid at high pressure, which comprises a vertically disposed steel cylinder closed at its lower end and provided with a removable upper end adapted to be firmly secured to the cylinder, a cylindrical reaction vessel composed of a bottom section and wall sections of material substantially more resistant to hot concentrated sulphuric acid and structurally substantially weaker than said steel cylinder, disposed within said cylinder and spaced therefrom to provide an annular passage between the steel cylinder and reaction vessel, an acid inlet at the bottom of said cylinder, at least one passage for sulphuric acid from the top of said annular passage into said reaction vessel, an inlet for passing olefine-containing gas into said reaction vessel near the bottom thereof, and a liquid outlet conduit for removing liquid reaction product from the bottom of said reaction vessel.

4. Apparatus for absorption of olefine from an olefine-containing gas by hot concentrated sulphuric acid at high pressure, which comprises a vertically disposed steel cylinder closed at its lower end and provided with a removable upper end adapted to be firmly secured to the cylinder, a cylindrical reaction vessel composed of sections of an acid-resistant material disposed within said cylinder and spaced therefrom to provide an annular passage between the steel cylinder and reaction vessel, an acid inlet at the bottom of said cylinder, at least one passage for sulphuric acid from the top of said annular passage into said reaction vessel, a liquid outlet conduit for removing liquid reaction product from the bottom of said reaction vessel, a plurality of horizontal baffles disposed in the lower portion of said reaction vessel and having small apertures for upward passage of gas therethrough and large passages for flow of liquid down therethrough, said large passages being disposed at opposite ends of adjacent baffles to provide tortuous flow of liquid through the lower end of the reaction vessel.

5. Apparatus for absorption of olefine from an olefine-containing gas by hot concentrated sulphuric acid at high pressure, which comprises a vertically disposed steel cylinder closed at its lower end and provided with a removable upper end adapted to be firmly secured to the cylinder, a cylindrical reaction vessel composed of sections of an acid-resistant material disposed within said cylinder and spaced therefrom to provide an annular passage between the steel cylinder and reaction vessel, an acid inlet at the bottom of said cylinder, at least one passage for sulphuric acid from the top of said annular passage into said reaction vessel, a liquid outlet conduit for removing liquid reaction product from the bottom of said reaction vessel, a plurality of horizontal baffles disposed in the lower portion of said reaction vessel and having small apertures for upward passage of gas therethrough and large passages for flow of liquid down therethrough, said large passages being disposed at opposite ends of adjacent baffles to provide tortuous flow of liquid through the lower end of the reaction vessel, vertically disposed cooling tubes supported by said removable end and passing through apertures in said baffles to a point near the bottom of said reaction vessel, said last-mentioned apertures being slightly larger than the cooling tubes so as to provide passages for flow of gas between the cooling tubes and the baffles.

6. Apparatus for absorption of olefine from an olefine-containing gas by hot concentrated sulphuric acid at high pressure, which comprises a vertically disposed steel cylinder closed at its lower end and provided with a removable upper end adapted to be firmly secured to the cylinder, a cylindrical reaction vessel composed of sections of an acid-resistant material disposed within said cylinder and spaced therefrom to provide an annular passage between the steel cylinder and reaction vessel, an acid inlet at the bottom of said cylinder, at least one passage for sulphuric acid from the top of said annular passage into said reaction vessel, a liquid outlet conduit for removing liquid reaction product from the bottom of said reaction vessel, a plurality of horizontal baffles disposed in the lower portion of said reaction vessel and having small apertures for upward passage of gas therethrough and large passages for flow of liquid down therethrough, said large passages being disposed at opposite ends of adjacent baffles to provide tortuous flow of liquid through the lower end of the reaction vessel, vertically disposed cooling tubes supported by said removable end and passing through apertures in said baffles to a point near the bottom of said reaction vessel, said last-mentioned apertures being slightly larger than the cooling tubes so as to provide passages for flow of gas between the cooling tubes and the baffles, a gas inlet conduit extending through said removable end down to a point near the bottom of said reaction vessel, and a gas outlet conduit extending through said removable end to a point near the top of the reaction vessel.

7. Apparatus for absorption of olefine from an olefine-containing gas by hot concentrated sulphuric acid at high pressure, which comprises a vertically disposed steel cylinder closed at its lower end and provided with a removable upper end adapted to be firmly secured to the cylinder, a cylindrical reaction vessel composed of sections of an acid-resistant material disposed within said cylinder and spaced therefrom to provide an annular passage between the steel cylinder and reaction vessel, an acid inlet at the bottom of said cylinder, at least one passage for sulphuric acid from the top of said annular passage into said reaction vessel, a liquid outlet conduit for removing liquid reaction product from the bottom of said reaction vessel, a plurality of horizontal baffles disposed in the lower portion of said reaction vessel and having small apertures for upward passage of gas therethrough and large passages for flow of liquid down therethrough, said large passages being disposed at opposite ends of adjacent baffles to provide tortuous flow of liquid through the lower end of the reaction vessel, vertically disposed cooling tubes supported by said removable end and passing through apertures in said baffles to a point near the bottom of said reaction vessel, said last-mentioned apertures being slightly larger than the cooling tubes so as to provide passages for flow of gas between the cooling tubes and the baffles, a gas inlet conduit extending through said removable end down to a point near the bottom of said reaction vessel, a gas outlet conduit extending through said removable end to a point near the top of the reaction vessel, said liquid outlet conduit extending vertically up through said reaction vessel to a point near the top thereof and having an enlargement at its upper end open at the top, and said gas outlet extending into and terminating within said enlargement.

8. In an apparatus for absorption of a gas by hot concentrated sulphuric acid, a vessel adapted to contain a continuous mass of sulphuric acid and having disposed within the area occupied by said mass of sulphuric acid, a series of horizontal baffles having small apertures for upward passage of gas therethrough and large passages for flow of liquid down therethrough, the large passages in adjacent baffles being disposed at opposite ends thereof and the small passages being sufficiently small to substantially inhibit downward flow of liquid countercurrent to flow of gas up therethrough.

9. In an apparatus for absorption of olefines from an olefine-containing gas by hot concentrated sulphuric acid, a vessel adapted to contain a continuous mass of sulphuric acid and having disposed within the area occupied by said mass of sulphuric acid, a series of horizontal baffles having small apertures for upward passage of gas therethrough and large passages for flow of liquid down therethrough, the large passages in adjacent baffles being disposed at opposite ends thereof and the small passages being sufficiently small to substantially inhibit downward flow of liquid countercurrent to flow of gas up therethrough.

10. In an absorber for absorption of olefine from an olefine-containing gas by hot concentrated sulphuric acid, means for removing residual gas and liquid reaction product and for maintaining a substantially constant liquid level in the absorber, which comprises a conduit having an open lower end near the bottom of the absorber and extending upwardly to a point above the desired liquid level and in communication with the gas space in said absorber above said level and a single outlet conduit extending from said first-mentioned conduit at the desired liquid level.

11. In an absorber for absorption of olefine from an olefine-containing gas by hot concentrated sulphuric acid, means for removing residual gas and liquid reaction product from said absorber and for maintaining a substantially constant liquid level therein, which comprises a vertically disposed conduit within said absorber having an open end near the bottom of the absorber and its upper end open to the gas space within and near the top of the absorber and a second conduit leading off from said absorber and having its open end within the absorber extending into and terminating within said open upper end.

12. In an apparatus for absorption of a gas by hot concentrated sulphuric acid, an absorption vessel, baffle plates disposed within said absorption vessel, cooling pipes suspended within said absorption vessel and extending through holes in said baffle plates, said holes being large enough to allow passage of gas but small enough to inhibit the opposing flow of a liquid, and ports for liquid flow in said baffle plates arranged on alternate sides of the absorption vessel so as to cause a liquid flowing therethrough to pursue a tortuous course, inlets at the top and bottom of the absorption vessel for liquid and for gas, respectively, and outlets at the top and bottom of said vessel for gas and for liquid, respectively.

13. In an apparatus for absorption of olefine from an olefine-containing gas by hot concentrated sulphuric acid, an absorption vessel, baffle plates disposed within said absorption vessel, cooling pipes suspended within said absorption vessel and extending through holes in said baffle plates, said holes being large enough to allow passage of gas but small enough to inhibit the opposing flow of a liquid, and ports for liquid flow in said baffle plates arranged on alternate sides of the absorption vessel so as to cause a liquid flowing therethrough to pursue a tortuous course, inlets at the top and bottom of the absorption vessel for liquid and for gas, respectively, and outlets at the top and bottom of said vessel for gas and for liquid, respectively.

14. In an apparatus for absorption of olefine from an olefine-containing gas by hot concentrated sulphuric acid, an absorption vessel, baffle plates disposed within said absorption vessel, cooling pipes suspended within said absorption vessel and extending through holes in said baffle plates, said holes being large enough to allow passage of gas but small enough to inhibit the opposing flow of a liquid, ports for liquid flow in said baffle plates arranged on alternate sides of the absorption vessel so as to cause a liquid flowing therethrough to pursue a tortuous course, a liquid outlet conduit extending vertically up through said absorption vessel to a point near the top thereof and having an enlarged open upper end and an outlet conduit leading off from said liquid outlet conduit at a point slightly below its open upper end, inlets at the top and bottom of the absorption vessel for liquid and for gas respectively.

SAMUEL W. GROSSMANN.
DONALD A. ROGERS.